(12) United States Patent
Daniel et al.

(10) Patent No.: US 10,843,912 B1
(45) Date of Patent: Nov. 24, 2020

(54) ELECTRIC ROTARY ACTUATOR FOR AERIAL WORK PLATFORM

(71) Applicant: Ox Industries, Inc., Houston, TX (US)

(72) Inventors: Jeffrey K. Daniel, Houston, TX (US); Muzyamba Koota, Shanghai (CN)

(73) Assignee: Ox Industries, Inc, Houston, TX (US)

( * ) Notice: Subject to any disclaimer, the term of this patent is extended or adjusted under 35 U.S.C. 154(b) by 0 days.

(21) Appl. No.: 16/938,712

(22) Filed: Jul. 24, 2020

Related U.S. Application Data

(60) Provisional application No. 62/879,395, filed on Jul. 26, 2019.

(51) Int. Cl.
| | |
|---|---|
| *B66F 11/04* | (2006.01) |
| *F16H 1/28* | (2006.01) |
| *F16D 55/02* | (2006.01) |
| *B66F 17/00* | (2006.01) |
| *F16D 121/26* | (2012.01) |

(52) U.S. Cl.
CPC .......... *B66F 11/044* (2013.01); *B66F 11/046* (2013.01); *B66F 17/006* (2013.01); *F16D 55/02* (2013.01); *F16H 1/28* (2013.01); *F16D 2121/26* (2013.01)

(58) Field of Classification Search
CPC ... B66F 11/044; B66F 11/046; F16D 2121/26
See application file for complete search history.

(56) References Cited

U.S. PATENT DOCUMENTS

| | | | | |
|---|---|---|---|---|
| 2,483,811 A | * | 10/1949 | Cullen | B23Q 1/54 269/69 |
| 2,628,321 A | * | 2/1953 | Anderson | H02K 7/1025 310/77 |
| 3,299,983 A | * | 1/1967 | Hubbard | B66F 11/046 182/2.11 |
| 3,483,948 A | * | 12/1969 | Thornton-Trump | B66F 11/044 182/2.7 |
| 3,526,295 A | * | 9/1970 | Cornet | B66F 11/044 182/2.3 |
| 3,590,948 A | * | 7/1971 | Milner, Jr. | B66F 11/044 182/2.1 |
| 3,856,108 A | * | 12/1974 | Grove | B66F 11/046 182/16 |
| 4,088,200 A | * | 5/1978 | Cowley | B66F 11/04 182/2.11 |
| 4,838,381 A | * | 6/1989 | Michaud | B66F 11/044 182/2.3 |
| 5,271,707 A | * | 12/1993 | Derksen | B66F 11/044 182/2.8 |

(Continued)

*Primary Examiner* — Colleen M Chavchavadze

(57) ABSTRACT

An aerial work platform having an electric rotary actuator for electrically rotating the aerial work platform. The aerial work platform includes a housing support to which an electric motor is mounted, the electric motor having output shaft that meshes with a compound planetary gearset disposed within a main gear housing. The planetary gearset is used to actuate a rotary shaft to which is attached a rotary bracket that supports an aerial work platform. An electric brake is disposed adjacent one of the rotary shaft or the motor output shaft to prevent rotation of a shaft when the motor is not energized or when loss of power occurs. The electric rotary actuator can be energized to rotate the aerial work platform in a lateral plane.

30 Claims, 9 Drawing Sheets

(56) References Cited

U.S. PATENT DOCUMENTS

| | | | | |
|---|---|---|---|---|
| 5,337,854 | A * | 8/1994 | Brandt | B66F 11/044 182/2.9 |
| 5,944,138 | A * | 8/1999 | Vollmer | B66F 11/044 182/2.1 |
| 6,585,079 | B1 * | 7/2003 | Weyer | B66F 9/0655 182/18 |
| 7,014,019 | B2 * | 3/2006 | Krug | B60T 13/743 188/167 |
| 8,352,129 | B2 * | 1/2013 | Yuan | B66C 13/06 701/50 |
| 8,443,936 | B1 * | 5/2013 | Raymond | B66F 11/046 182/2.1 |
| 8,550,211 | B2 * | 10/2013 | Higgins | B66F 11/044 182/2.4 |
| 9,145,939 | B2 * | 9/2015 | Giering | F16D 65/18 |
| 10,589,972 | B2 * | 3/2020 | Mark | B66F 17/006 |
| 2018/0134533 | A1 * | 5/2018 | Ewert | B66F 9/0655 |
| 2020/0080574 | A1 * | 3/2020 | Slightam | F15B 11/20 |
| 2020/0240485 | A1 * | 7/2020 | Nanahara | F16D 65/183 |

\* cited by examiner

US 10,843,912 B1

ELECTRIC ROTARY ACTUATOR FOR AERIAL WORK PLATFORM

CROSS-REFERENCE TO RELATED APPLICATION

This application claims the benefit of priority to U.S. Provisional Application No. 62/879,395, filed Jul. 26, 2019 the benefit of which is claimed and the disclosure of which is incorporated by reference in their entirety.

TECHNICAL FIELD

The present invention relates generally to aerial work platforms and, more particularly, to laterally rotatable work platforms.

BACKGROUND OF THE INVENTION

Aerial work platforms for the construction industry are typically mounted at the end of a boom that extends outwardly from a wheeled vehicle. The vehicle and the boom are movable to position the work platform at a desired location. The boom can extend and retract to raise and lower the work platform to a desired vertical location. Some work platforms can also be rotated relative to the boom in a lateral plane to point the work platform at a desired angle in the lateral plane relative to the boom. Accordingly, the work platform can be maneuvered to position a user adjacent to an elevated work site.

In one aspect of this conventional device, the work platform can be rotated relative to the boom in the lateral plane with a hydraulically actuated rack and pinion arrangement. For example, a rack can be attached to the work platform and can engage the teeth of a pinion fixedly attached to the boom. As the rack is driven linearly back and forth in the lateral plane relative to the fixed pinion (for example, with a pressurized hydraulic fluid), the rack and the work platform will rotate in the lateral plane about the fixed pinion. Alternatively, the rack and pinion can be replaced with a hydraulically actuated worm gear drive for rotating the work platform relative to the boom.

In other systems, a hydraulic rotary actuator is utilized to rotate the platform in a lateral plane relative to the boom. The hydraulic rotary actuator utilizes hydraulic fluid supplied by hydraulic lines extending along the boom to energize the actuator. The actuator includes a helical screw bounded by on either end by a hydraulic piston. Actuation of a first piston by hydraulic fluid causes the helical screw to rotate in a first direction and actuation of a second piston by hydraulic fluid causes the helical screw to rotate in the opposite direction.

One drawback with the foregoing hydraulic attachment and rotation devices is that they require hydraulic lines extending along the length of the boom. Because the booms extend and retract, these lines must be in the form of flexible hoses that can readily move or flex with movement of the boom. Such hoses can add significant weight to the boom, reducing the amount of weight that can be carried by the work platform.

DETAILED DESCRIPTION OF THE INVENTION

The present invention is directed toward devices for electrically rotating an aerial work platform or other support structure, and in particular, an electric rotary actuator having a housing support to which an electric motor is mounted, the electric motor having output shaft that meshes with a planetary gearset disposed within a main gear housing of the support structure, the planetary gearset used to actuate a rotary shaft to which is attached a rotary bracket that supports an aerial work platform. An electric brake is disposed adjacent one of the rotary shaft or the motor output shaft to prevent rotation of a shaft when the motor is not energized. The electric rotary actuator can be energized to rotate the aerial work platform in a lateral plane.

Figure 1:
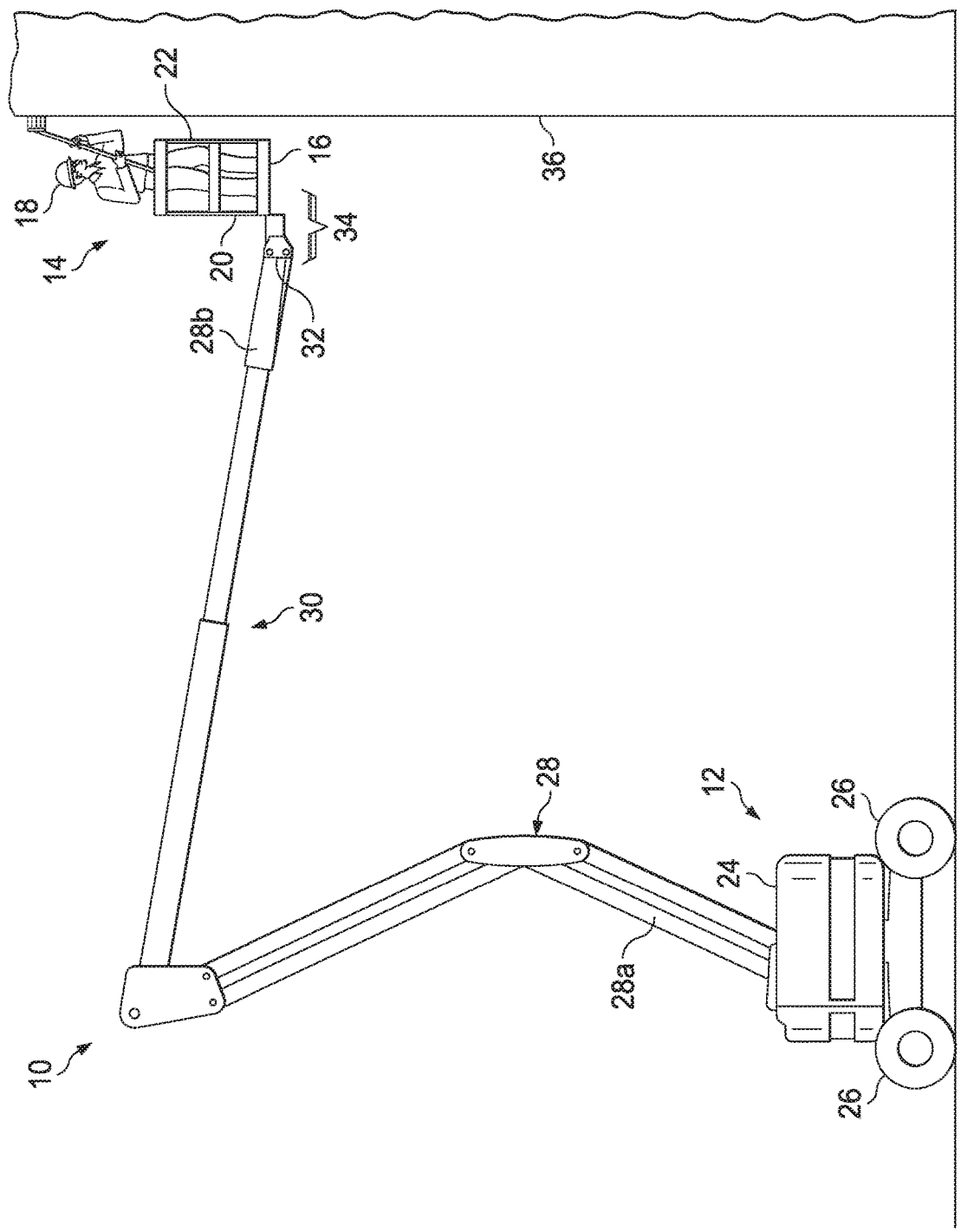
FIG. 1 is a side elevational view of an aerial work platform supported relative to a vehicle with a rotator assembly in accordance with an embodiment of the invention.

With reference to FIG. 1, shown therein is a boom lift assembly 10 having a base 12, such as a vehicle, and to which a movable boom 28 is attached at a first end 28a of movable boom 28. Attached to movable boom 28 at a second end 28b of movable boom 28 is an electric rotary actuator assembly 34 to which is attached a platform assembly 14 for supporting a load. The platform assembly 14 can have a support surface 16 for supporting a load 18, that can include a user, tools, equipment and/or materials. A rear portion 20 of the work platform can face generally toward the base 12 and a forward portion 22 can face away from the base 12. In one embodiment, the base 12 is a vehicle that includes a drive unit 24 having wheels 26 for propelling the vehicle and the platform assembly 14 to a desired location. In other embodiments, the base 12 can have tracks instead of wheels, or the wheels can engage rails, or the vehicle can be an unpowered vehicle, such as a towed trailer. In still further embodiments, the base 12 can be a multi-purpose vehicle, such as a truck that can support the platform assembly 14 in addition to a separate payload. While the base 12 is shown as a vehicle, a stationary support platform which can position the boom lift assembly 10 is contemplated.

Figure 2:
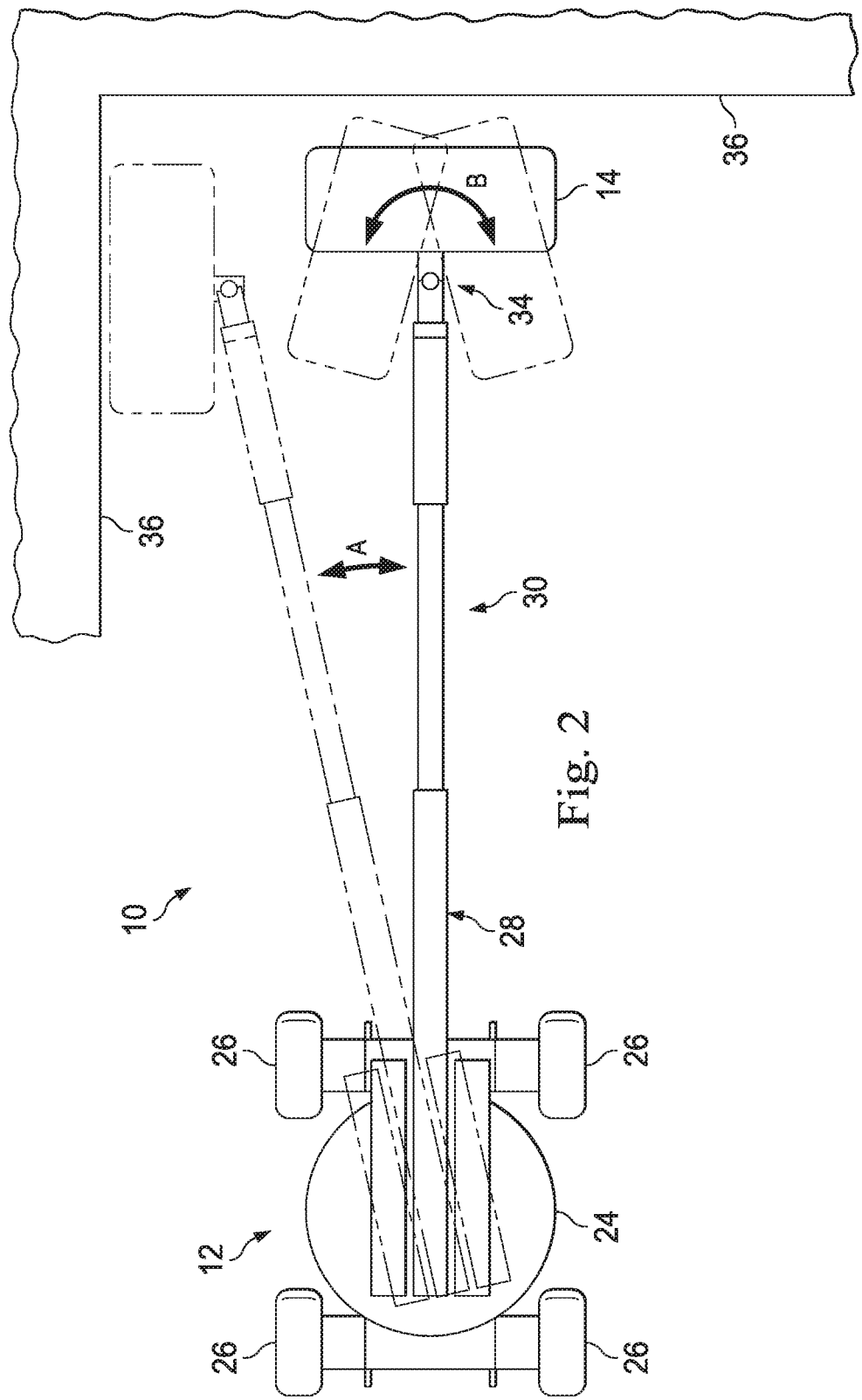
FIG. 2 is a top plan view of the vehicle shown in FIG. 1 with the work platform rotated in a lateral plane to a series of positions.

Movable boom 28 can be an articulated boom assembly or a telescoping boom assembly or include both articulated arms and telescoping arms, such as is shown in FIG. 1 where a lower portion of boom 28 adjacent first end 28a is articulated and an upper portion of boom 28 adjacent second end 28b includes a telescoping arm 30 for supporting the platform assembly 14 and moving the work platform vertically and laterally relative to the base 12. An actuator link 32 can adjust the tilt of the platform assembly 14 when the work platform moves up and down, as will be discussed below. The platform assembly 14 is coupled to the boom 28 with an electric rotary actuator assembly 34 that can rotate the platform assembly 14 in a lateral plane relative to the boom 28. Accordingly, the platform assembly 14 can be maneuvered to place the load in a desired position adjacent a structure 36, such as a building wall, for example during construction or maintenance activities. FIG. 2 is a top plan view of the boom lift assembly 10 shown in FIG. 1. As is shown in dashed lines, the boom 28 of the boom lift assembly 10 can rotate relative to the base 12, as indicated by arrow A. The electric rotary actuator assembly 34 can rotate the platform assembly 14 relative to boom 28, as indicated by arrow B. In one or more embodiments, electric rotary actuator assembly 34 can rotate the platform assembly 14 as indicated by arrow B through at least approximately 180 degrees. Accordingly, the platform assembly 14 can be moved laterally to a variety of locations without moving the base 12. For example, the platform assembly 14 can be moved along two adjoining building walls of structure 36, while the base 12 remains in a fixed location, as shown in FIG. 2.

Figure 3:
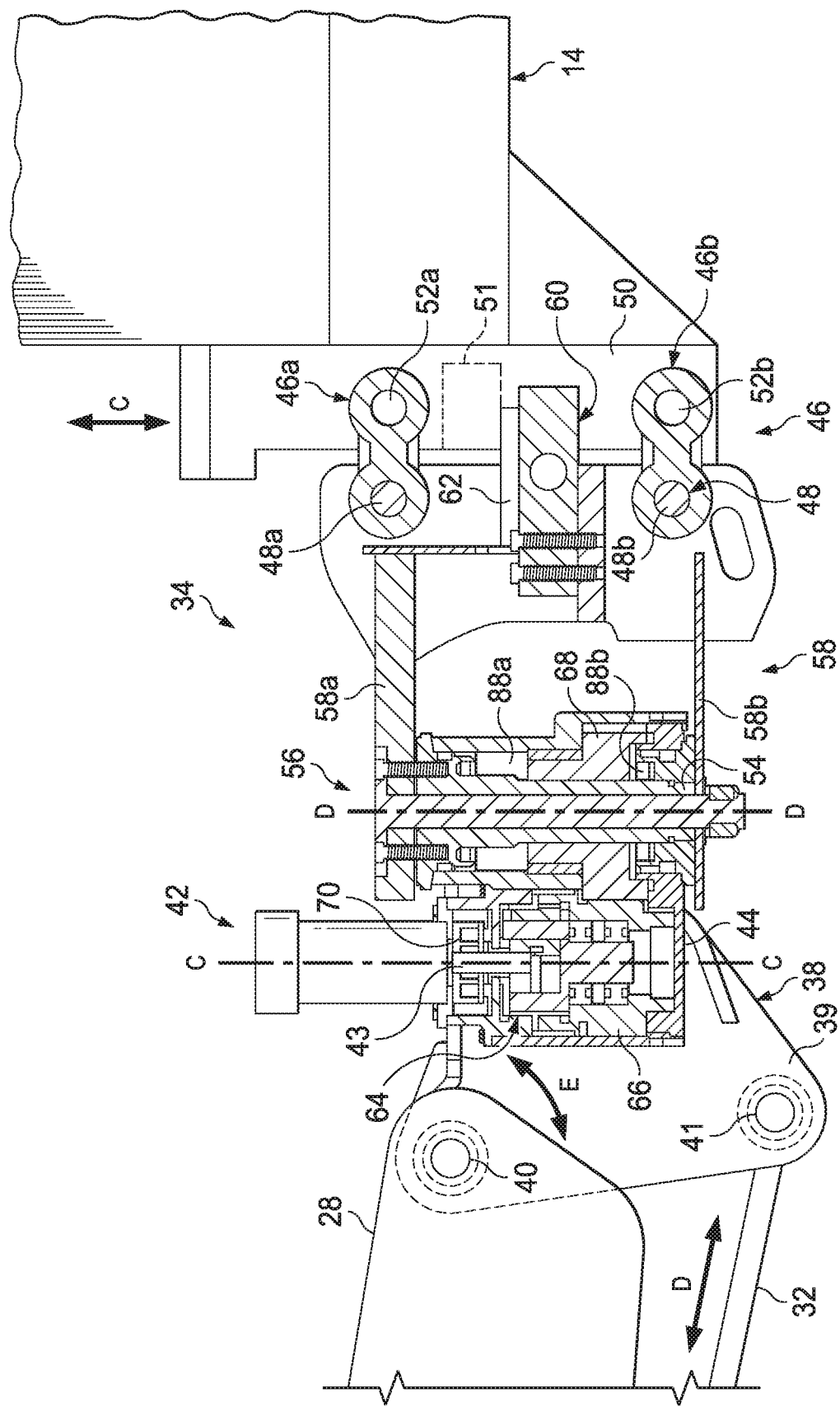
FIG. 3 is a partial cut-away side elevational view of the rotator work platform assembly and a portion of the work platform shown in FIG. 1.

FIG. 3 is a partial cut-away side elevational view of the electric rotary actuator assembly 34 and a portion of the platform assembly 14 shown in FIG. 1. The electric rotary actuator assembly 34 includes an electric motor 42 having an output shaft 43 that rotates the platform assembly 14 relative to the boom 28 in a rotational plane in clockwise and counterclockwise rotational directions about an output shaft axis C-C, as will be discussed in greater detail below. The electric motor 42 can be rigidly secured to a housing support 38 that attaches to the second end 28b of movable boom 28. In particular, housing support 38 includes a boom attachment structure 39 pivotally attached to movable boom 28 at an arm pivot joint 40. An actuator link 32 is pivotally attached to the boom attachment structure 39 at arm pivot joint 41 below the arm pivot joint 40 and can extend and retract (as indicated by arrow D) to rotate the housing support 38 about the arm pivot joint 40 (as indicated by arrow E). Accordingly, the actuator link 32 can tilt the electric rotary actuator assembly 34 and the platform assembly 14, or keep the platform assembly 14 approximately horizontal as the boom 28 moves the work platform about.

The housing support 38 further includes a main gear housing 44 and a rotary shaft housing 54. Electric motor 42 may be attached to main gear housing 44 so that the output shaft 43 extends into main gear housing 44. A rotary shaft 56 is mounted in the rotary shaft housing 54 and is disposed to rotate about rotary shaft axis D-D, which rotary shaft axis D-D is parallel to output shaft axis C-C. A rotary bracket 58 is rigidly attached to the rotary shaft 56 and is likewise disposed to rotate about rotary shaft axis D-D. In one or more embodiments, main gear housing 44 and rotary shaft housing 54 may be a single actuator assembly housing.

In one or more embodiments, the electric rotary actuator assembly 34 can also include a pair of parallel corrector members or links 46 (shown as an upper link 46a and a lower link 46b) that allow the platform assembly 14 to move in the direction of arrow C and perpendicular to axis C-C and axis D-D. In one embodiment, the links 46 are pivotally attached at one end to the rotary actuator assembly 34 with pivot joints 48 (shown as an upper pivot joint 48a and a lower pivot joint 48b). The opposite ends of the links 46 are pivotally attached to platform assembly 14. In one or more embodiments, platform assembly 14 includes a platform bracket 50 at two pivot joints 52 (shown as an upper pivot joint 52 a and a lower pivot joint 52 b). The platform bracket 50 is fixedly attached to the platform assembly 14. The links 46 can rotate about the pivot joints 48 and 52 to allow the platform assembly 14 to move upwardly and downwardly relative to the electric rotary actuator assembly 34 while the work platform maintains a substantially horizontal orientation.

Platform bracket 50 may include a rearwardly extending load transfer arm 51. The load transfer arm 51 transmits at least a portion, and in this embodiment substantially all of the load supported by the platform assembly 14 and thereby supports the work platform against movement under a load in the downward direction. In one embodiment, load transfer arm 51 bears against a spring (not shown) to maintain the links 46 in their substantially horizontal orientations when the platform assembly 14 is unloaded.

While permitting movement of the platform assembly 14 in the selected downward direction under a load, and return in the upward direction when unloaded, the links 46 restrict movement in directions out of alignment with the selected load direction except for rotation of the work platform in the rotational plane in response to operation of electric rotary actuator assembly 34.

In a further aspect of this embodiment, the electric rotary actuator assembly 34 can include a sensor 60 carried by platform assembly 14 and disposed to measure a condition of platform assembly 14, such as torque generated at second end 28b of movable boom 28 by loads carried by platform assembly 14. In one or more embodiments load transfer arm 51 bears against sensor 60. Those of skill in the art will appreciate that sensor 60 may be provided for detecting vertical motion of the platform assembly 14 relative to the electric rotary actuator assembly 34. In one or more embodiments, the sensor 60 can include a normally open switch having a plunger 62 that closes the switch when the platform assembly 14 descends by a selected amount under the weight of a selected load. In one or more embodiments, the sensor 60 can trigger an audible or visual signal when the switch is closed or otherwise activated. In one or more embodiments, when the switch is closed or otherwise activated, the electric motor 42 can be deactivated to halt rotation of platform assembly 14. In any case, the sensor 60 rotates with the platform assembly 14 when the electric rotary actuator assembly 34 rotates the platform assembly 14 about the rotary shaft axis D-D, as will be discussed in greater detail below. In one or more embodiments, sensor 60 is a torque sensor and plunger 62 is a load sensor contact pin.

Disposed within main gear housing 44 and driven by electric motor 42 is a planetary gear set 64. Planetary gearset 64 includes a rotatable ring gear 66 that is the output gear of the planetary gearset 64. Rotatable ring gear 66 engages a gear 68 of the rotary shaft 56. In one or more embodiments, a reduction ratio of between 1000-2000:1 may be achieved. In one or more embodiments, a reduction ratio of approximately 1034.48:1 may be achieved.

Finally, in one or more embodiments, a brake 70 may be provided adjacent either the output shaft 43 of the electric motor 42 or adjacent the rotary shaft 56. In one or more embodiments, brake 70 is an electric brake as illustrated, and may be disposed along the output shaft 43 about output shaft axis C-C to interrupt rotation of output shaft 43 when electric brake 70 is de-energized, as will be explained below.

Figure 4:
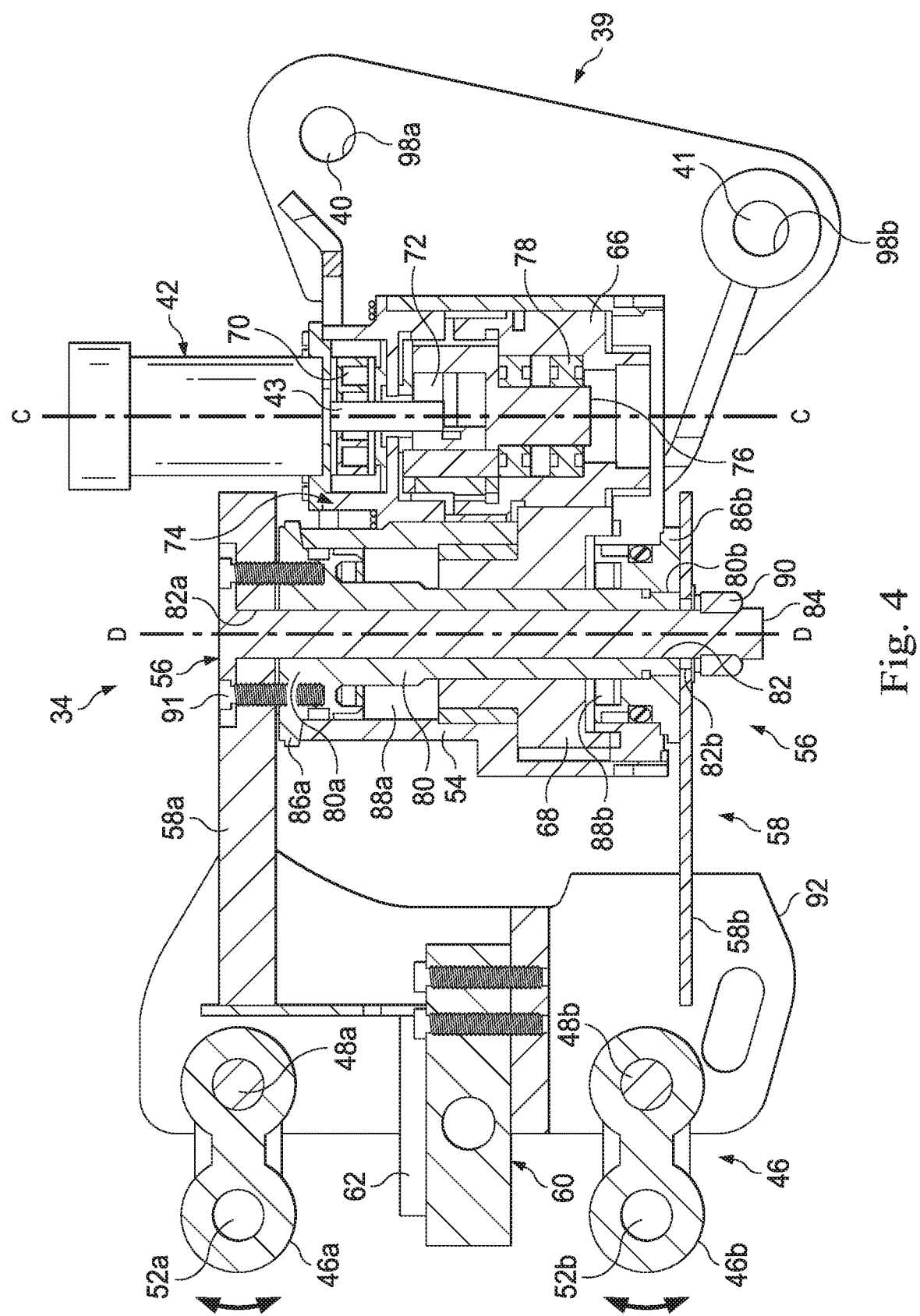
FIG. 4 is an enlarged, partially cut-away side elevational view of one embodiment of an electronic rotary actuator shown in FIG. 3.
Figure 5:
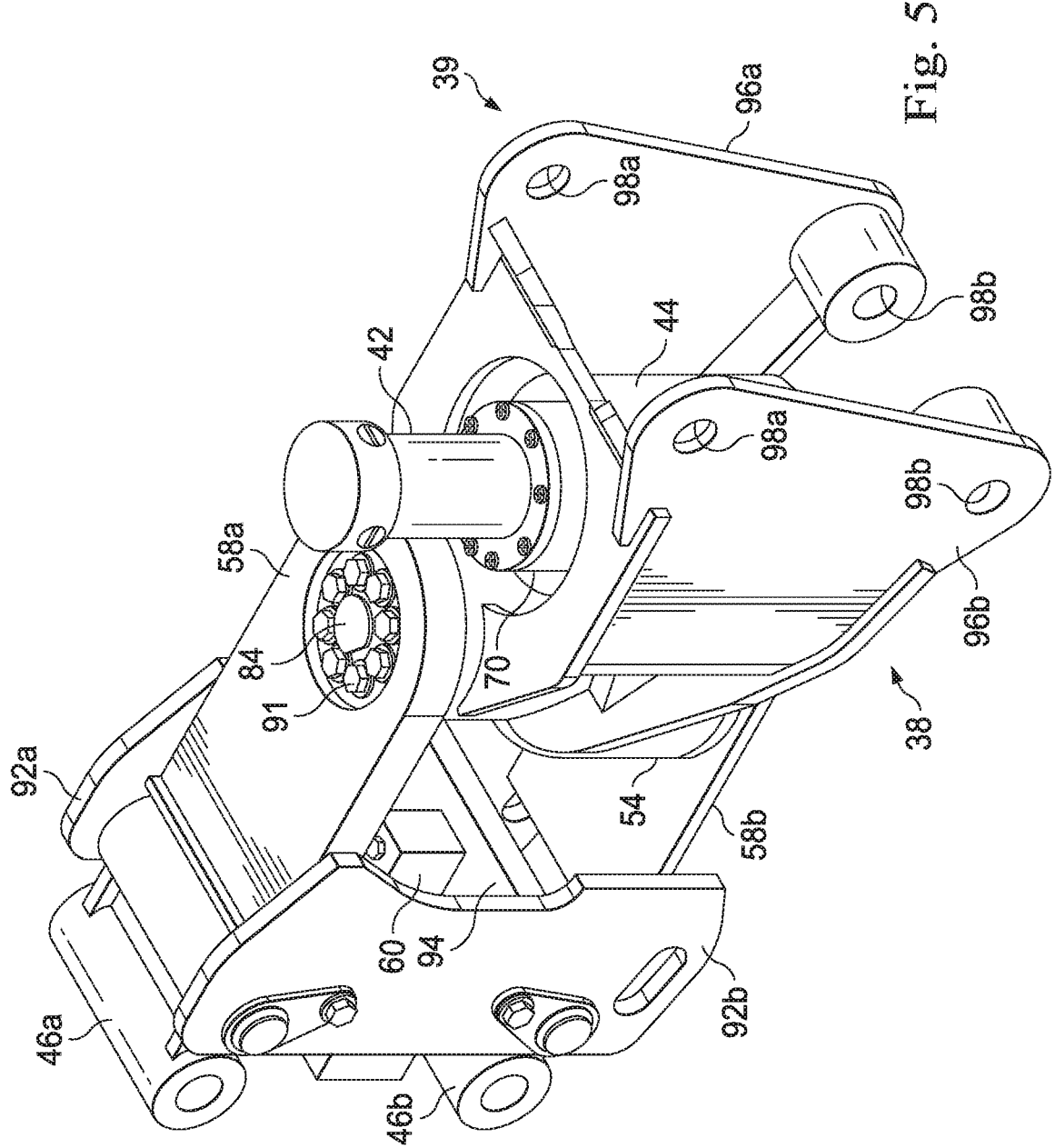
FIG. 5 is a perspective view of the electronic rotary actuator of FIG. 4.
Figure 6A:
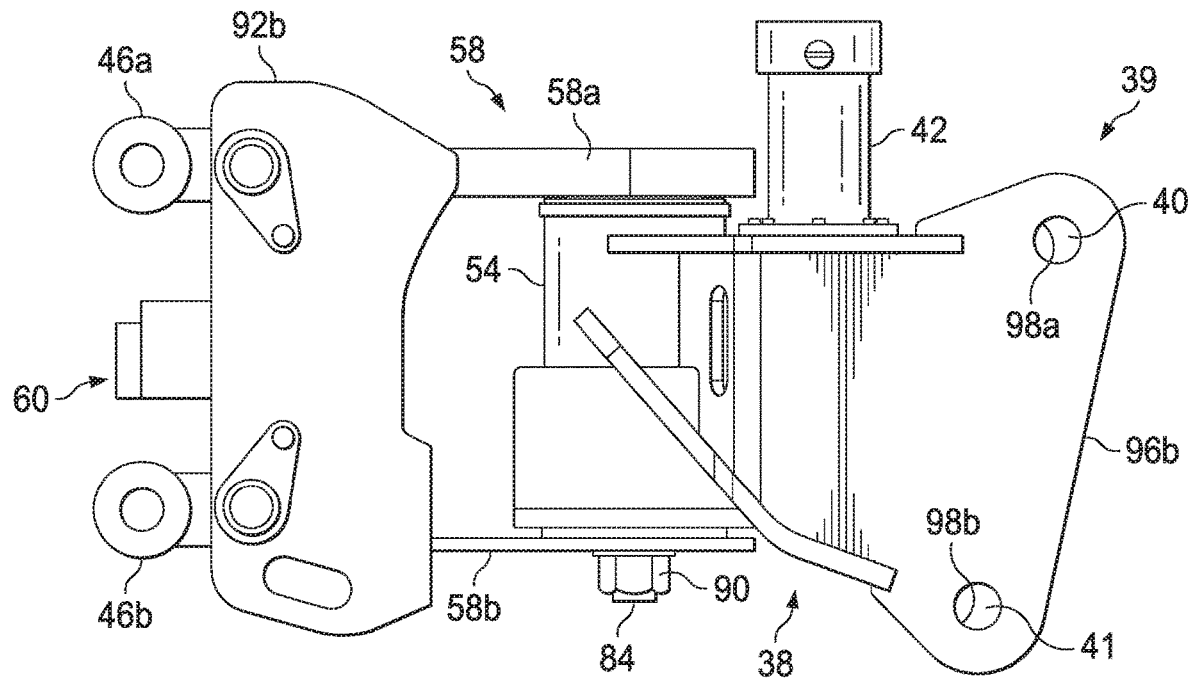
FIG. 6a is side elevation and plan views of the electronic rotary actuator of FIG. 4.
Figure 6B:
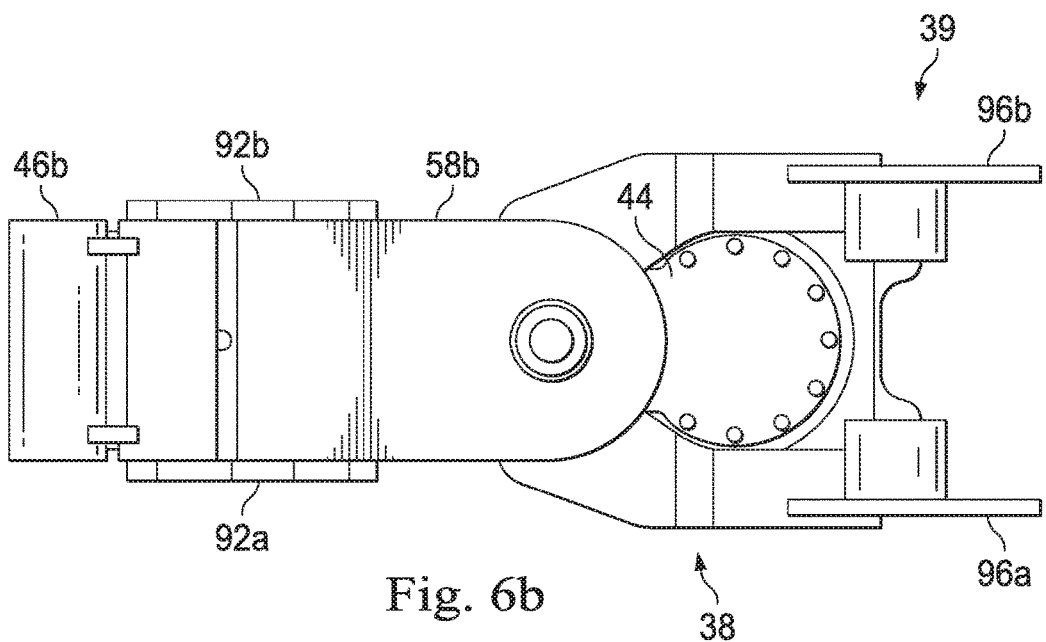
FIG. 6b is a plan view of the electronic rotary actuator of FIG. 4.
Figure 6C:
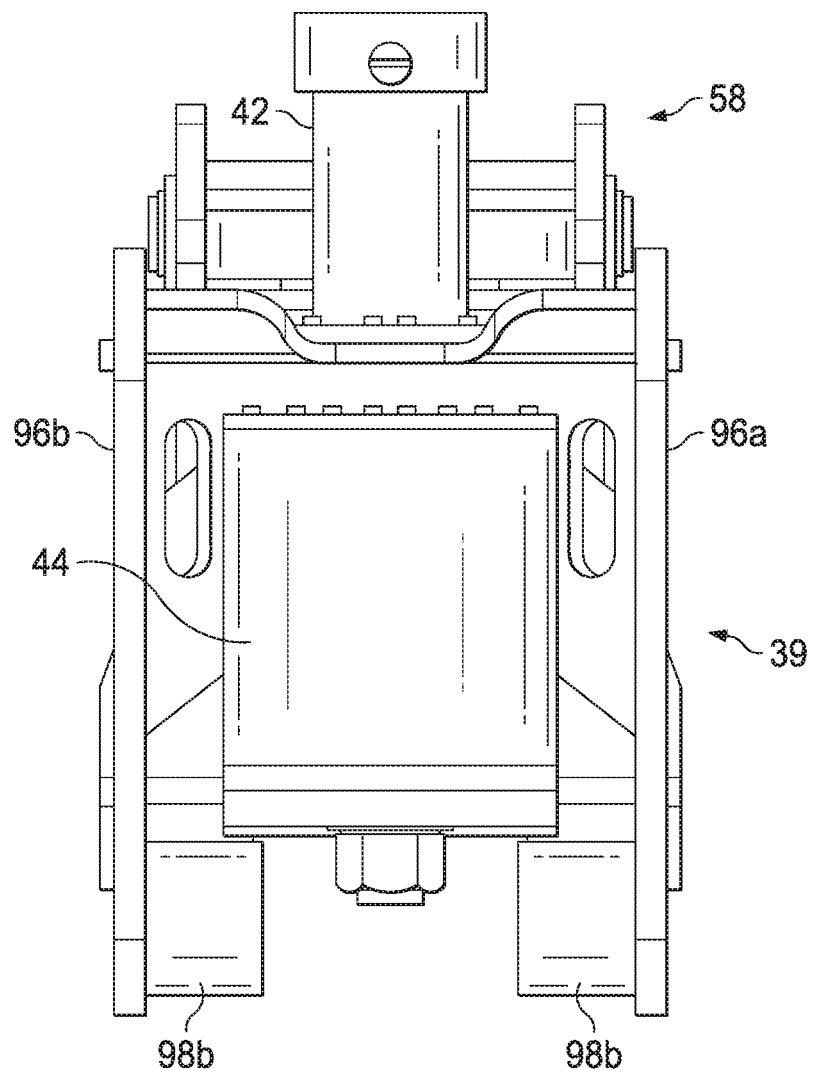
FIG. 6c is a front elevation of the electronic rotary actuator of FIG. 4.

FIG. 4 is an enlarged, partially cut-away side elevational view of the electric rotary actuator assembly 34. In the illustrated embodiment, electric motor 42 is attached to main gear housing 44 so that output drive shaft 43 extends along drive shaft axis C-C. Drive shaft 43 engages a planetary gearset 64 disposed within main gear housing 44. Planetary gearset 64 may include at least one sun gear 72 mounted on the motor output shaft 43. Sun gear 72 meshes with at least two planet gears 74 supported on a carrier 76. The planet gears 74 in turn mesh with ring gear 66. Carrier 76 is fixed thereby allowing ring gear 66 to rotate on bearings 78. In other embodiments, a planet gears 74 mesh with a first ring gear (not shown) held stationary with respect to main gear housing 44, while carrier 76 is allowed to rotate. In such embodiments, carrier 76 may include a pinion (not shown) that meshes with rotatable ring gear 66. Other arrangements of planetary gearset 64 are likewise contemplated by the disclosure. Thus, in one or more embodiments, planetary gearset 64 is a compound planetary gearset 64, and thus may include two or more sets of planet gears, and further may include two sun gears 72. In some embodiments, the planet gears 74 are stepped compound or composite, with each planet gear 74 having a first gear of a first diameter mounted together with a second gear of a second diameter different than the first diameter, as is well known in the art. Each of the first and second diameter gears of a stepped planet gear may be a spur gear. The sun gear 72 of the compound planetary gearset 64 engages the first diameter gear of the planet gears 74 and the ring gear 66 of the compound planetary gearset 64 engages the second diameter gear of the planet gears 74. In other words, in embodiments of a compound planetary gearset having stepped planet gears, each compound planet gear 74 is a pair of rigidly connected and longitudinally arranged gears of different radii. One of the two gears of the planet gear 74 engages the centrally located sun gear 72 while the other engages the outer ring gear 66. In other embodiments of a compound planetary gearset, may have a first sun gear of a first diameter and a second sun gear of a second diameter different than the first sun gear. In such case, each set of planet gears may include a first planet gear and a second planet gear. In any event, regardless of the arrangement of the compound planetary gearset, in one or more embodiments, the gear ratio of the compound planetary gearset is approximately 2000:1 or greater. The rotatable ring gear 66 in turn drives a portion of the rotary shaft 56. Rotary shaft 56 is disposed in rotary shaft housing 54 and extends along rotary shaft axis D-D. In one or more embodiments, rotary shaft 56 includes an elongated rotary shaft 80 having a first end 80a and a second end 80b with a through bore 82 extending between the two ends 80a, 80b. Through bore 82 is disposed for receipt of a tie rod 84. One or more set of bearings 88 may be disposed in rotary shaft housing 54 to support rotary shaft 80 and permit rotary shaft 80 to rotate about shaft axis D-D relative to rotary shaft housing 54.

Specifically, in the illustrated embodiment, at least a first set of bearings 88a is disposed adjacent first end 80a of rotary shaft 80 and a second set of bearings 88b is disposed adjacent second end 80b of rotary shaft 80.

In one or more embodiments, rotary shaft 80 may include a first hub 86a disposed at the first end 80a of rotary shaft 80. Additionally, a second hub 86b may be disposed adjacent the second end 80b of rotary shaft 80. First hub 86a may be integrally formed with rotary shaft 80 with the first set of bearings 88a adjacent first hub 86a. Second hub 86b may support the second set of bearings 88b and attach to rotary shaft housing 54. As such, rotary shaft 80 rotates relative to second hub 86b.

Rotary shaft 56 further includes a rotary shaft gear 68 disposed along rotary shaft 80. In one or more embodiments, rotary shaft gear 68 may be integrally formed on rotary shaft 80, while in other embodiments, rotary shaft gear 68 may be slidingly fixed thereon. In any event, rotary shaft gear 68 meshes with rotatable ring gear 66 described above.

As shown, tie rod 84 is utilized to secure rotary bracket 58 to rotary shaft 56. Specifically, rotary bracket 58 includes an upper plate 58a spaced apart from a lower plate 58b. Upper plate 58a includes an aperture 82a and lower plate 58b includes an aperture 82b which aligns with aperture 82a along shaft axis D-D when rotary bracket 58 is secured to rotary shaft 56. In this regard tie rod 84 extends through each of apertures 82a, 82b of their respective upper and lower plates 58a, 58b so that upper plate 58a abuts first hub 86a and lower plate 58b abuts second hub 86b. A fastener 90 may be used to secure tie rod 84 to rotary shaft 56. In one or more embodiments, fastener 90 may be a threaded nut or a pin. Likewise, fasteners 91 may be utilized to fixedly attach upper plate 58a to first hub 86a to prevent rotation of bracket 58 relative to rotary shaft 80.

As shown in FIG. 4, but better seen in FIGS. 5, 6a, 6b and 6c, rotary bracket 58 may further include side plates 92, namely a first side plate 92a spaced apart from a second side plate 92b. Spaced apart side plates 92a, 92b function as an attachment point for links 46. While not limited to a particular configuration for links 46, in one or more embodiments, each link 46 may be a two bar link that extends fully between plates 92a, 92b. In any event, links 46a, 46b are rotatable relative to plates 92a, 92b as described above. Tie rod 84 is shown extending through upper plate 58a while fasteners 91 are shown securing rotary bracket 58 to rotary shaft 80 (not shown). Sensor 60 is shown supported on rotary bracket 58 by a cross-bar 94 extending between plates 92a, 92b. Also shown in FIGS. 5, 6a-6c is boom attachment structure 39 of housing support 38. As seen, boom attachment structure 39 includes a first boom plate 96a spaced apart from a second boom plate 96b. Each boom plate 96 includes an upper aperture 98a and a lower aperture 98b. It will be appreciated that boom plates 96a and 96b are spaced apart from one another so that their corresponding upper and lower apertures 98a, 98b align with one another, where upper apertures 98a form arm pivot joint 40 and lower apertures 98b form arm pivot joint 41.

Figure 7:
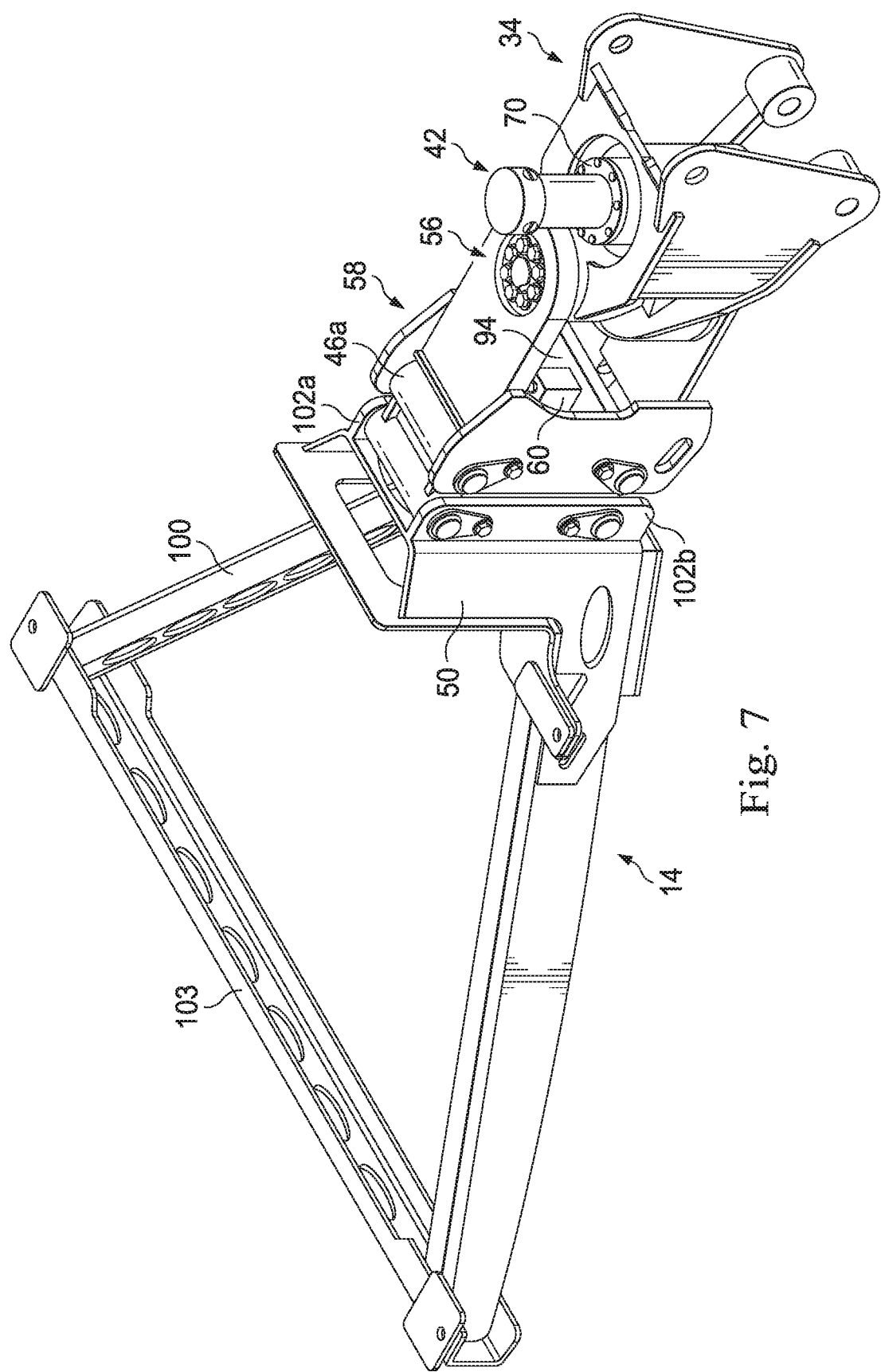
FIG. 7 is a perspective view of an electronic rotary actuator with a basket holder attached.

FIG. 7 illustrates a platform assembly 14 attached to rotary bracket 58 by links 46. In one or more embodiments, platform assembly 14 includes a platform bracket 50. Platform bracket 50 may include side plates 102, namely a first side plate 102a spaced apart from a second side plate 102b. Spaced apart side plates 102a, 102b function as an attachment point for links 46, which are rotatable relative to plates 102a, 102b. Sensor 60 is shown supported on rotary bracket 58 by a cross-bar 94 extending between plates 92a, 92b. Platform bracket 50 may include a rearwardly extending load transfer arm 51 (see FIG. 3). The load transfer arm 51 transmits at least a portion, and in this embodiment substantially all of the load supported by the platform assembly 14 and thereby supports the work platform against movement under a load in the downward direction. A work implement 100 can be attached to platform bracket 50. In one or more embodiments, work implement 100 may be a support surface 16 (see FIG. 1) carried by a support frame 103. In other embodiments, work implement 100 may be a basket. In other embodiments, work implement 100 may include buckets, augers, blades, drills, tongs, nozzles, claws, cutters, forks, grapples, hammers, grippers, harvester heads, lift groups, material handling arms, mulchers, multi-processors, rakes, pulverizers, crushers, rippers, saws, shears, stump grinders, tillers, trenchers, or any other work implement which would be known by one of ordinary skill in the art.

Figure 8:
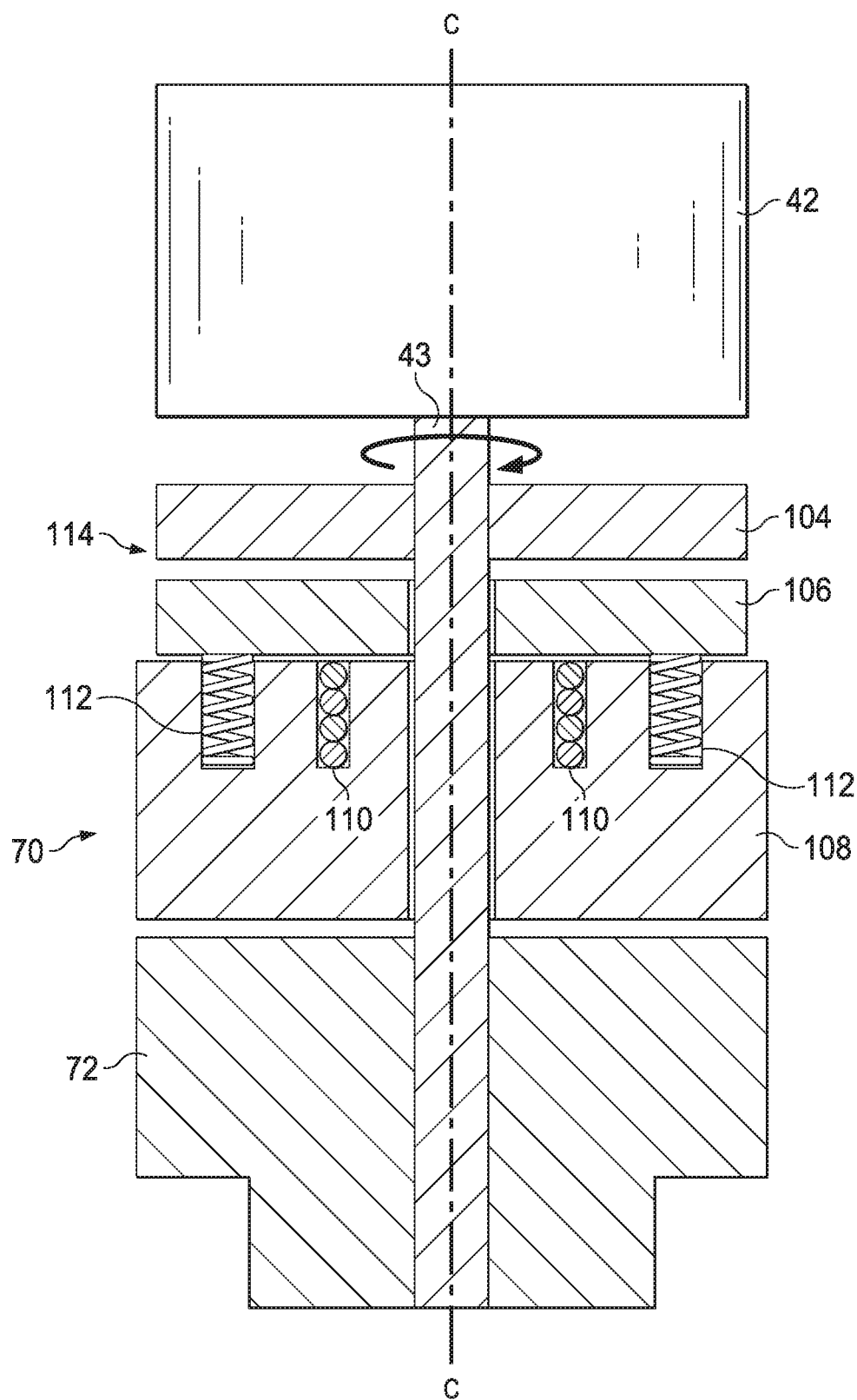
FIG. 8 is a partial cut-away side elevation view of a portion of one embodiment of an electric brake of the electric rotary actuator.

As previously described, a brake 70 may be utilized to apply a braking force to drive shaft 43 or to rotary shaft 80 to interrupt pivotal movement of platform assembly 14. In one or more embodiments, brake 70 is an electric brake. Turning to FIG. 8, one embodiment of such an electric brake 70 is shown in more detail, however, the electric brake 70 of FIG. 8 is only illustrative and other in other embodiments of electric brakes and non-electric brakes are contemplated by the disclosure. As shown, brake 70 is a spring applied-coil energized brake. While brake 70 is illustrated as installed along drive shaft 43, in other embodiments, brake 70 may be disposed along rotary shaft 80. In this same vein, while brake 70 is illustrated as installed between electric motor 42 and sun gear 72 along drive shaft 43, in other embodiments, brake 70 may be disposed at other points along drive shaft axis C-C or even adjacent drive shaft 43. In any event, brake 70 includes a friction plate 104 fixedly mounted to the motor output shaft 43. Spaced apart from friction plate 104 along shaft axis C-C is a coil housing 108 in which an electric coil 110 is supported. A brake plate 106 is slidingly disposed along the output shaft 43 adjacent friction plate 104 and between friction plate 104 and electric coil 110. Finally, a resilient device 112 is provided to urge brake plate 106 axially along drive shaft 43 towards friction plate 104. In one or more embodiments, coil housing 108 may also house resilient device 112. In one or more embodiments, resilient device 112 is one or more spring that bias brake plate 106 towards friction plate 104. During operation, energized electric coil 110 attracts ferromagnetic actuating plate 106 against the force of springs 112 and away from friction plate 104 to permit friction plate 104 to rotate with motor shaft 43. When coil 110 is actuated, brake plate 106 abuts coil housing 108 so as to be spaced apart from friction plate 104 as illustrated by gap 114.

Upon loss of electric power to coils 110, when the brake 70 is applied, springs 112 urge the brake plate 106 against the friction plate 104. As such, the interaction between brake plate 106 and friction plate 104 interrupts rotation of friction plate 104, which in turn, interrupts rotation of drive shaft 43 on which friction plate 104 is fixedly mounted. In some embodiments, operation of brake 70 may be synchronized with operation of motor 42. For example, when motor 42 is activated, electricity may be provided to electric coils 110 so as to energized brake coils 110 and attract brake plate 106, thereby disengage brake plate 106 from friction plate 104 mounted on the drive shaft 43, thereby permitting the drive shaft 43 to rotate when the motor is activated. When the motor is not activated (or in the case where electricity to the motor is interrupted, then the brake coils 110 release the brake plate 106, which in turn re-engages the friction plate 104 to prevent rotation of the shaft 43.

Thus, a work platform assembly has been described. In one or more embodiments, work platform assembly may include a housing support, the housing support including a boom attachment structure, a main gear housing and a rotary shaft assembly housing; an electric motor with an output shaft attached to the housing support, the output shaft extending along an output shaft axis; a planetary gearset disposed within the main gear housing and meshed with the motor output shaft; a rotary shaft assembly disposed along a rotary shaft assembly axis that is parallel with the output shaft axis, the rotary shaft assembly carried by the housing support and meshed with the planetary gearset; a rotary bracket attached to the rotary shaft assembly; and an electric brake disposed adjacent one of the rotary shaft assembly axis or the output shaft axis. In other embodiments, a work platform assembly may include a housing support, the housing support including a boom attachment structure, a main gear housing and a rotary shaft assembly housing, the boom attachment structure having a first plate spaced apart from a second plate, a first set of opposing apertures spaced apart from a second set of opposing apertures, each set of opposing apertures disposed along an aperture axis, wherein the two aperture axis are parallel with one another; an electric motor with an output shaft attached to the housing support, the output shaft extending along an output shaft axis that is spaced apart but perpendicular to the aperture axis; a compound planetary gearset disposed within the main gear housing and having a rotatable ring gear meshed with the motor output shaft; a rotary shaft assembly disposed along a rotary shaft assembly axis that is parallel with the output shaft axis, the rotary shaft assembly carried by the housing support and meshed with the rotatable ring gear of the compound planetary gearset; a rotary bracket attached to the rotary shaft assembly; and an electric brake disposed along one of the rotary shaft assembly axis or the output shaft axis. Relatedly, a boom lift assembly has been described and may include a base; a movable boom assembly having a first end and a second end, the first end of the boom assembly movably attached to the base; a electric rotary actuator attached to the second end of the boom assembly; and a platform assembly attached to the electric rotary actuator, where the electric rotary actuator may include a housing support, the housing support including a boom attachment structure, a main gear housing and a rotary shaft assembly housing; an electric motor with an output shaft attached to the housing support, the output shaft extending along an output shaft axis; a planetary gearset disposed within the main gear housing and meshed with the motor output shaft; a rotary shaft assembly disposed along a rotary shaft assembly axis that is parallel with the output shaft axis, the rotary shaft assembly carried by the housing support and meshed with the planetary gearset; a rotary bracket attached to the rotary shaft assembly; and an electric brake disposed adjacent one of the rotary shaft assembly axis or the output shaft axis.

For any one of the foregoing embodiments, one or more of the following elements may be combined alone or in combination with any other elements:

The electric brake is disposed along the output shaft axis.

The electric brake is disposed along the output shaft axis between the motor and the planetary gearset.

The electric brake comprises a friction plate fixedly mounted to the motor output shaft; a brake plate slidingly disposed along the output shaft adjacent the friction plate, a spring engaging the brake plate and disposed to urge the brake plate axially along the motor output shaft towards the friction plate; and an electric coil disposed adjacent the brake plate.

The electric brake comprises a friction plate fixedly mounted to the rotary shaft assembly; a brake plate slidingly disposed along the rotary shaft assembly adjacent the friction plate; a spring engaging the brake plate and disposed to urge the brake plate axially along the rotary shaft assembly towards the friction plate; and an electric coil disposed adjacent the brake plate.

The planetary gearset comprises a sun gear mounted on the motor output shaft; at least two planetary gears meshed with the sun gear and supported on a carrier, the carrier having a pinion gear; a fixed ring gear meshed with the planetary gears; and a rotatable ring gear meshed with the pinion gear of the carrier.

The rotary shaft assembly comprises a rotary shaft assembly gear meshed with the planetary gearset.

The rotary shaft assembly gear is meshed with the rotatable ring gear of the planetary gearset.

A work implement is attached to the housing support

The electric brake is disposed in the main gear housing.

The planetary gearset is disposed in the main gear housing.

The motor input shaft extends into the main gear housing.

The sets of opposing apertures are disposed in their respective plates adjacent an edged of their respective plates.

The rotary shaft assembly is disposed in the rotary shaft assembly housing.

The electric brake is disposed in the rotary shaft assembly housing.

A platform mounting frame movably attached to the rotary bracket by a linkage assembly, the platform mounting frame movable parallel with the rotary shaft assembly axis.

A load cell assembly mounted on the rotary bracket and engaged by the platform mounting frame.

The load cell assembly comprises a load cell.

A load cell assembly mounted on the platform mounting frame and engaged by the rotary bracket.

The load cell assembly comprises an actuator abutting the platform mounting frame.

The load cell assembly comprises an actuator abutting the rotary bracket.

The rotary bracket comprises an upper plate spaced apart from a lower plate, the spaced apart upper and lower plates each having an aperture formed therein and aligned with the aperture of the respective spaced apart upper and lower plate.

The rotary shaft assembly is disposed between the upper and lower plates of the rotary bracket so that the apertures in the upper and lower plate are coaxial with the rotary shaft assembly axis.

A tie rod extending through the apertures of the upper and lower plate and securing the rotary bracket to the rotary shaft assembly.

The rotary bracket further comprises spaced apart first and second side plates, with the linkage assembly secured between the first and second side plates and rotatable relative to the side plates.

The load cell assembly is mounted to the rotary bracket between the side plates.

The rotary shaft assembly comprises a shaft extending from a first end to a second end and having a through bore extending between the two ends along the rotary shaft assembly axis and disposed for receipt of a tie rod.

The rotary shaft assembly further comprises a first hub formed at the first end of the shaft and a second hub formed at the second end of the shaft.

The rotary shaft assembly further comprises a gear mounted along the shaft and meshed with the rotating ring gear of the planetary gearset.

The platform mounting frame comprises a platform assembly.

The platform assembly comprises a platform The platform assembly comprises a basket.

The platform assembly comprises a work implement.

The base is a vehicle.

The base comprises wheels.

The movable boom is an articulated boom.

The movable boom is a telescoping boom.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed, rather, the intention is to cover all modifications, equivalents, and alternatives falling within the spirit and scope of the disclosure as defined by the appended claims.

The invention claimed is:

1. A work platform assembly comprising:
a housing support, the housing support including a boom attachment structure, a main gear housing and a rotary shaft housing;
an electric motor attached to the housing support, the electric motor including an output shaft defined along an output shaft axis and extending into the main gear housing;
a planetary gearset disposed within the main gear housing and meshed with the motor output shaft;
a rotary shaft rotatably mounted in the rotary shaft housing, the rotary shaft extending along a rotary shaft axis that is parallel with the output shaft axis, the rotary shaft having a rotary shaft gear mounted thereon and meshed with the planetary gearset;
a rotary bracket attached to the rotary shaft; and
an electric brake disposed adjacent one of the rotary shaft axis or the output shaft axis; wherein the housing support is configured to be mounted between a boom end and a platform assembly.

2. The work platform assembly of claim 1, wherein the planetary gearset is a compound planetary gearset.

3. The work platform assembly of claim 1, wherein the planetary gearset comprises a sun gear mounted on the motor output shaft; at least two planetary gears meshed with the sun gear and supported on a fixed carrier; and a rotatable ring gear meshed with the planetary gears of the carrier.

4. The work platform assembly of claim 1, wherein the electric brake is disposed along the output shaft axis between the motor and the planetary gearset.

5. The work platform assembly of claim 4, wherein the electric brake comprises a friction plate fixedly mounted to the motor output shaft; a brake plate slidingly disposed along the output shaft adjacent the friction plate; a spring engaging the brake plate and disposed to urge the brake plate axially along the motor output shaft towards the friction plate; and an electric coil disposed adjacent the brake plate.

6. The work platform assembly of claim 1, further comprising a platform assembly attached to the rotary bracket.

7. The work platform assembly of claim 6, wherein the platform assembly comprises a platform mounting frame movably attached to the rotary bracket by a linkage assembly, the platform mounting frame movable in a direction parallel with the rotary shaft axis.

8. The work platform assembly of claim 6, further comprising load cell assembly mounted on the platform assembly and engaged by the rotary bracket.

9. The work platform assembly of claim 7, wherein the rotary bracket comprises an upper plate spaced apart from a lower plate, the spaced apart upper and lower plates each having an aperture formed therein and aligned with the aperture of the respective spaced apart upper and lower plate.

10. The work platform assembly of claim 9, wherein the rotary bracket further comprises spaced apart first and second side plates, with the linkage assembly secured between the first and second side plates and rotatable relative to the side plates.

11. The work platform assembly of claim 9, further comprising tie rod extending through the apertures of the upper and lower plate and securing the rotary bracket to the rotary shaft.

12. The work platform assembly of claim 9, wherein the platform assembly is selected from the group consisting of a platform, a basket and a work implement.

13. The work platform assembly of claim 6, wherein the platform assembly is selected from the group consisting of a platform, a basket and a work implement.

14. The work platform assembly of claim 1, further comprising a base to which is attached a movable boom having a first end attached to the base and a second end attached to the boom attachment structure.

15. The work platform assembly of claim 14, wherein the base is a vehicle.

16. The work platform assembly of claim 14, wherein the movable boom is an articulated boom.

17. A work platform assembly comprising:
- a housing support, the housing support including a boom attachment bracket and an actuator assembly housing;
- an electric motor rigidly fixed to the housing support, the electric motor including an output shaft defined along an output shaft axis and extending into the actuator assembly housing;
- a compound planetary gearset disposed along the output shaft axis and meshed with the motor output shaft;
- a rotary shaft rotatably mounted in the actuator assembly housing, the rotary shaft extending along a rotary shaft axis that is parallel with but spaced apart from the output shaft axis, the rotary shaft having a rotary shaft gear mounted thereon and meshed with the planetary gearset;
- a rotary bracket attached to the rotary shaft; and
- an electric brake disposed within the actuator assembly housing adjacent one of the rotary shaft axis or the output shaft axis; wherein the housing support is configured to be mounted between a boom end and a platform assembly.

18. The work platform assembly of claim 17, wherein the rotary shaft further comprises a bore extending therethrough along the rotary shaft axis, and wherein the rotary bracket comprises an upper plate spaced apart from a lower plate, the spaced apart upper and lower plates each having an aperture formed therein and aligned with through bore of the rotary shaft, the rotary bracket further comprising spaced apart first and second side plates with a linkage assembly secured between the first and second side plates and rotatable relative to the side plates.

19. The work platform assembly of claim 18, further comprising a tie rod extending through the apertures of the upper and lower plate and securing the rotary bracket to the rotary shaft.

20. The work platform assembly of claim 19, wherein the linkage assembly comprises an upper link pivotally mounted between the two side plates and a spaced apart lower link pivotally mounted between the two side plates.

21. The work platform assembly of claim 20, further comprising a load cell sensor mounted on the rotary bracket between the upper and lower links.

22. The work platform assembly of claim 21, further comprising a platform assembly having a platform mounting frame movably attached to the rotary bracket by the upper and lower links, the platform mounting frame movable in a direction parallel with the rotary shaft axis.

23. The work platform assembly of claim 22, wherein the platform assembly is selected from the group consisting of a platform, a basket and a work implement.

24. The work platform assembly of claim 23, further comprising a base to which is attached a movable boom having a first end attached to the base and a second end attached to the boom attachment structure.

25. The work platform assembly of claim 24, wherein the base is a vehicle.

26. The work platform assembly of claim 24, wherein the movable boom is an articulated boom.

27. A work platform assembly comprising:
- a base;
- a movable boom assembly having a first end and a second end, the first end of the boom assembly movably attached to the base;
- an electric rotary actuator attached to the second end of the boom assembly; and
- a platform assembly attached to the electric rotary actuator;
- wherein the electric rotary actuator comprises a housing support, the housing support including a boom attachment bracket pivotally attached to the second end of the boom assembly, and an actuator assembly housing;
- an electric motor rigidly fixed to the housing support, the electric motor including an output shaft defined along an output shaft axis and extending into the actuator assembly housing;
- a compound planetary gearset disposed along the output shaft axis and meshed with the motor output shaft;
- a rotary shaft rotatably mounted in the actuator assembly housing, the rotary shaft extending along a rotary shaft axis that is parallel with but spaced apart from the output shaft axis, the rotary shaft having a rotary shaft gear mounted thereon and meshed with the planetary gearset;
- a rotary bracket attached to the rotary shaft; and
- an electric brake disposed within the actuator assembly housing adjacent one of the rotary shaft axis or the output shaft axis.

28. The work platform assembly of claim 27, wherein the electric brake is disposed along the output shaft axis between the motor and the planetary gearset, and wherein the electric brake comprises a friction plate fixedly mounted to the motor output shaft; a brake plate slidingly disposed along the output shaft adjacent the friction plate; a spring engaging the brake plate and disposed to urge the brake plate axially along the motor output shaft towards the friction plate; and an electric coil disposed adjacent the brake plate.

29. The work platform assembly of claim 28, wherein the base comprises wheels.

30. The work platform assembly of claim 29, wherein the movable boom is an articulated boom.

* * * * *